March 23, 1965 G. W. SEULEN ETAL 3,174,738
APPARATUS FOR INDUCTIVELY HARDENING THE
BEARING SURFACES ON CRANKSHAFTS
Filed Aug. 8, 1960 5 Sheets-Sheet 1

Inventors
Gerhard Seulen
Hermann Kuhlbars
Hermann Wetzel
Adolf Graule
By Cushman, Darby & Cushman
Attorneys

United States Patent Office 3,174,738
Patented Mar. 23, 1965

3,174,738
APPARATUS FOR INDUCTIVELY HARDENING THE BEARING SURFACES ON CRANKSHAFTS
Gerhard W. Seulen, Remscheid, Hermann Kuhlbars, Wuppert-Elberfeld, and Hermann V. Detzel and Adolf Graule, Wasseralfingen, Wurttemberg, Germany, assignors to Deutsche Edelstahlwerke Aktiengesellschaft, Krefeld, Germany; Allgemeine Elektricitats-Gesellschaft, Berlin-Grunewald, Germany; and Maschinenfabrik Alfing Kessler Kommandit-Gesellschaft, Wasseralfingen, Wurttemberg, Germany; all companies of Germany
Filed Aug. 8, 1960, Ser. No. 154,086
Claims priority, application Germany, Aug. 19, 1959, D 31,320
12 Claims. (Cl. 266—5)

The present invention relates to apparatus for hardening the bearing surfaces on crankshafts.

It is already known to use movable units for inductively heating bearing surfaces on crankshafts incidental to hardening, said units comprising a transformer and an inductor which embraces only part of the treated surface of the work. During the process of heating and quenching the crankshafts revolve and the inductor rides on the bearing that its to be treated. In these known machines heating and quenching is performed more or less automatically. In practice they have been quite successful but it is a disadvantage of these machines that they do not lend themselves to a design which will permit of the work being automatically loaded in and unloaded from the machine and that these operations must necessarily be performed by hand or with the aid of hoisting means. If the machine were to form an element in a continuous production line these operations of loading and unloading the work would have to be automatic to ensure that the hardening machine proper were constantly operated in synchronism with the other production units comprised in the line.

It is the object of the present invention firstly to solve this problem and preferably to provide an arrangement which eliminates the intervention of or reduce idle times between the heating and quenching operations in such manner that all the required surfaces on any one crankshaft can be hardened in the course of a single passage of the work through the machine. The advantage gained by such an arrangement would be that the necessary operations could then be readily synchronised with the rate of progress in a production line without the need of specially handling the work for taking it into and out of the line.

According to one feature of the present invention, the workpiece is automatically conveyed and is then gripped for drive of rotation, the unit or units then displaced in the direction towards the gripped workpiece while positively guided until the inductor or inductors partially embrace the portion or portions of the shaft that are to be hardened and the drive of rotation then initiated, the inductor or inductors being free to be pendently deflected and participate in the orbital movement of the crank pins while riding on the surface thereof and thus remain in heating relation to the said pin or pins whilst the workpiece rotates.

More specifically the workpiece may be automatically loaded into the machine and positioned by rotation in relation to the inductor or inductors. The units comprising the inductors (and usually transformers) are then lowered to bring them into effect at the surfaces of the work that is to be hardened. The units are arranged to be positively guided in the direction towards the workpiece when this has been set up, though free then to deflect as aforesaid. When the units have thus been lowered, the work is again rotated and the inductors which yieldably ride on the crankpins can then participate in the orbit of the pins. The proper positioning of the workpiece preparatory to the actual hardening process is performed by partially rotating the work and stopping the same in that position in which the crankpins which are to be hardened align with the direction of the positively controlled path of advance of the units. When this position has been established, the units, and hence the inductors are lowered on to the crankpins and heating followed by quenching commences, the rotation of the workpiece being resumed.

This method of procedure not only permits the hardening operation as such, but also the processes of loading the workpieces and consecutively feeding them from station to station to be fully automatically controlled.

For performing this method the invention proposes an apparatus in which each hardening station is equipped with a slide adapted to be vertically raised and lowered, the inductor units being suspended therefrom by attaching them to linkages, e.g., pairs of swinging arms of equal length disposed in the manner of parallelogram linkages, and in which the work is held between two centres of which at least one is driven. Common drive means may be provided for the slides comprised in each station, said drive means consisting of a bar which can be lowered and raised by a crank plate, and from which the slides are suspended by rods which give them free slidable mobility when in lowered position. The weight of the slides and of the units articulated thereto may be substantially balanced by springs or counter-weights but a slight over-weight is allowed to remain, which permits the inductors to ride on the crankpins and easily to participate in their motions.

The workpiece mountings are provided with spindles adapted to clamp the work automatically between centres and to impart rotation thereto. The spindles are arranged first to rotate the work into a dead centre position to align the crankpins with the inductors and then briefly to stop whilst the inductors are lowered onto the crankpins before rotation of the work is resumed for the purpose of heating and then quenching the same.

An intermittently operating work displacing means may be provided adapted to convey the work horizontally to at least one hardening station and preferably to successive hardening stations. The elevational level of the work conveying means may be suitably adjusted for the work to come to rest slightly below the centres of the two spindles. This slight difference in level between the work conveying means and the centres has the effect that by its engagement between the two centres the work will be lifted clear of the conveying means so that it is free to revolve during the following treatment without being obstructed by the conveying means.

Conveniently the conveying means may consist of two chains which at given intervals are fitted with V rests for the reception thereon of the work. This work conveying device in the machine may be fed by a preliminary feeder device, likewise preferably consisting of two chains provided with V rests. These V rests are relatively so disposed that the workpieces cannot be deposited otherwise than in the V rests, thus ensuring that transfer from the preliminary conveyor to the primary conveyor in the actual machine is performed in reliable manner.

Assuming for instance that it is desired to treat a four-throw crankshaft with three main bearings in such a machine, the crankpins may be dealt with in a first hardening station and the main bearings in a second hardening station. After having been treated in the first station the crankshaft may then be re-deposited on the primary conveyor means and conveyed to the second station, although an intermediate station where the work remains stationary may be provided. In the case of six-throw crankshafts with seven main bearings it may be expedient to perform the required operations in three or four stations instead of only two, all the stations being in axial alignment. If desired two stations may be supplied alternately by a common generator and a crankshaft arranged at each station, certain of the crankpins being heated in one station and quenched and during the quenching operation the generator may be switched over to the other station where certain of the main bearings are heated; then when these bearings have been heated, the generator can be switched back to the first station and the other of the crankpins thereat heated; the generator then switched back to the second station during the next quenching stop and the other main bearing or bearings at that station heated. In other words, a machine according to the invention can be easily adapted to the particular nature of the workpiece by the provision of an appropriate number of hardening stations and to perform the hardening in various suitable sequences.

The drawings illustrate a preferred form of construction of the proposed hardening machine. The example shown in the drawings is a machine comprising two hardening stations for hardening a four-throw crankshaft by the method according to the invention.

FIG. 2 is an end-on view without the feeder conveyor, and in

Figure 1:
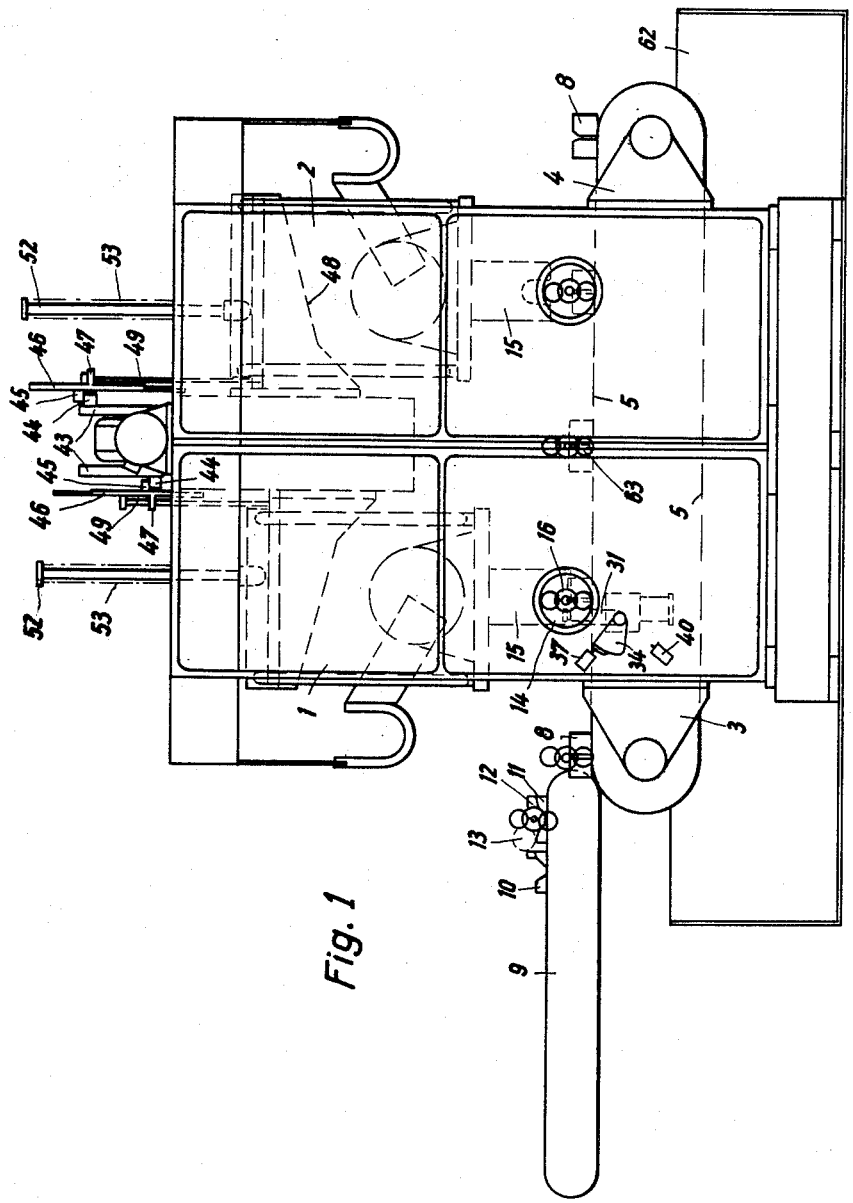
FIG. 1 is a side elevation of the proposed machine.

The machine according to the invention which is exemplified in the drawings will be described in such a way that the automatic performance of the consecutive operations of feeding, gripping the work between centres, and hardening will be readily understood as the description proceeds.

Figure 2:
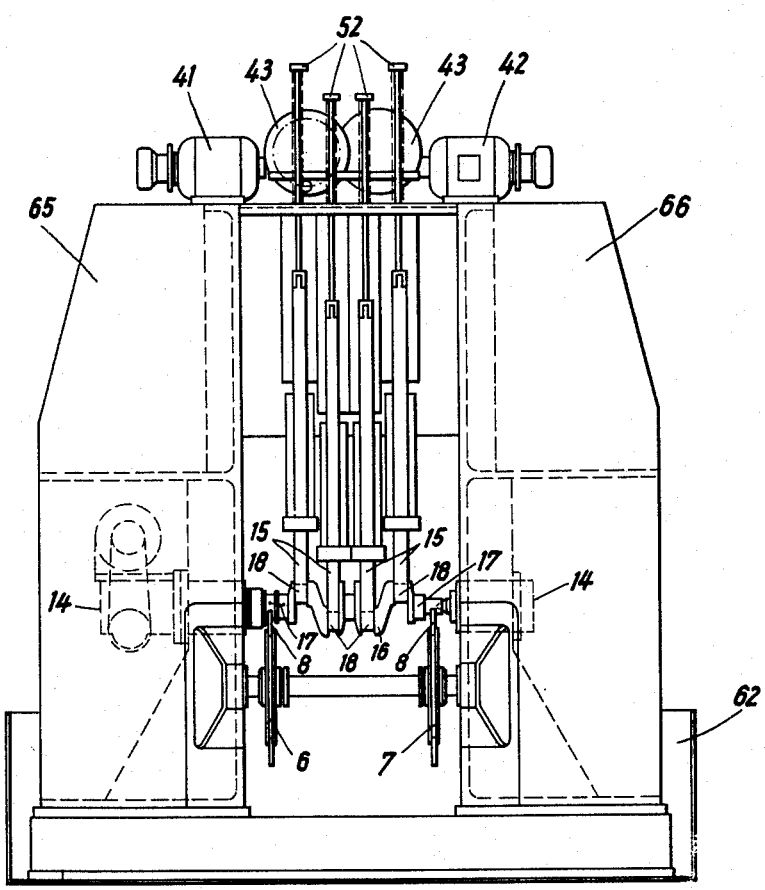

With reference now to FIG. 1 the machine comprises a frame consisting of two symmetrical similar halves 1 and 2. Each frame carries a hardening station. Bolted to the outside of the lower third of each frame is a bracket 3, 4 for supporting a primary conveyor 5 consisting of two chains suspended between sprocket wheels 6 and 7 (FIG. 2). At appropriate intervals corresponding with the timing of consecutive working stages the chains are provided with V rests 8 for receiving the workpieces from a preliminary feed conveyor 9. The latter also consists of two chains and travels in the horizontal direction. However, the preliminary feed conveyor may be arranged to operate at any desired angle of inclination.

The preliminary conveyor 9 is likewise fitted with V rests 10. These are spaced closely together and the leading flank 11 of each V has a rising flange 12. The purpose of this flange 12 is to prevent the workpieces from being malaligned when loaded into the V's. Once a workpiece has been deposited on the belt in a position such as that shown in dotted lines at 13 it will automatically slide into the bottom of the V. The presence of the flanges also ensures that the workpieces are gently and reliably transferred, when they reach the end of the preliminary feed conveyor, into the V rests 8 of the horizontal primary conveyor 5 which forms part of the actual machine. The preliminary feed conveyor 9 as well as the primary conveyor 5 are intermittently driven, and it will be understood that the timing of their operating and stopping periods is suitably synchronised.

The workpieces are deposited upon the upper reach of the primary conveyor 5 which preferably may be supported in guide means and they are taken in one step into position between the spindle heads shown at 14 in FIGS. 1 and 2. In this position the work is vertically below the inductors indicated at 15.

Figure 3:
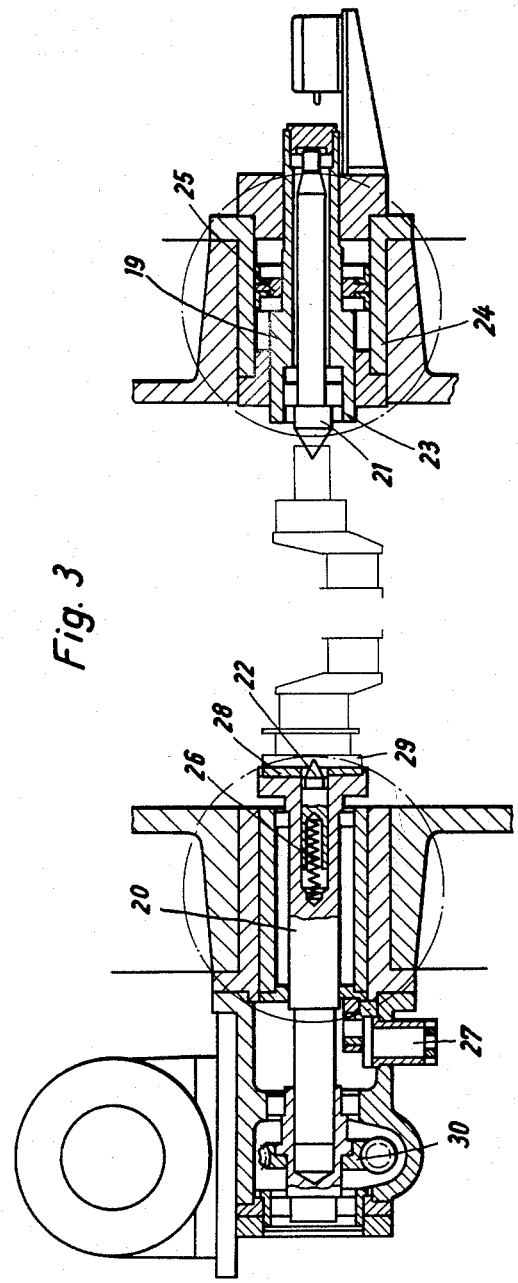
FIG. 3 are the spindle heads shown on a larger scale.

Between spindles 14 (cf. particularly FIG. 2) the work 16 must be manipulated in several respects. First it must be gripped between the centres for imparting rotation thereto during the ensuing hardening operation. Secondly, for hardening the main bearings 17 the work must be lifted clear of the V rests 8 on the conveyor chains. Conveniently the work should also be slightly lifted for treating the crankpins 18. The arrangements provided for effecting this operation are illustrated in FIG. 3.

On each side of the primary conveyor 5 is a spindle head 19 and 20, the latter transmitting drive of rotation to the crankshaft at one end and the former co-operating therewith and being urged, e.g., by hydraulic pressure as is hereinafter described, against the other end of the crankshaft. The centres 21 and 22 of the spindles align in a plane a few millimetres above the plane in which the work arrives on the primary conveyor, that is to say above the plane which contains the centre axis of the work as it rests on the said conveyor. Therefore, when the centres are advanced to grip the points at the ends of the work, the work will be lifted from the conveyor by the above-mentioned small amount so that it is clear of the conveyor. The desired lift can be obtained by arranging the centres to be slightly eccentric and higher in relation to end notches in the crankshaft, so that when the centres are forced into the said notches the centres will automatically lift the crankshaft by the desired amount, e.g., 1 to 2 mm., as the centres push into the notches.

In order to permit this action of gripping and slightly raising the work to be performed the spindle head 19 embodies a plunger. Centre 21 is rotatably mounted in a bush 23. Bush 23 is acted upon by a plunger 25 which is reciprocatable in the spindle casing 24 by hydraulic or pneumatic pressure. In other words, the centre 21 is adapted to be axially advanced and retracted. The centre of the opposite spindle head is spring-loaded, as indicated at 26, and can yield to axial pressure. The spindle head as such is axially movable by an eccentric 27 and lockable in the illustrated limit position by said eccentric 27. The face plate of the spindle is provided with a friction lining 28.

The centre 21 of spindle head 19 can therefore be axially advanced under pressure against the workpiece and the centre will engage the notch point, at the same time pushing the work on to the centre 22 of spindle head 20 until it axially aligns with the spindles. Finally the flange 29 of the workpiece will make contact with the friction face 28 surrounding the centre 22. The workpiece is thus firmly gripped between the two spindle heads 19 and 20 in frictional engagement with spindle 20.

Before the operation of hardening begins the cranks must be angularly swung into their dead centre positions to permit the inductors to be automatically lowered on to the same. To this end the work is first angularly repositioned by rotating spindle 20 about its longitudinal axis. In the illustrated example a worm drive 30 is provided for thus rotating the spindle. The rotary motion is transmitted to the work between the two centres through the friction lining of face 28.

Figure 4:
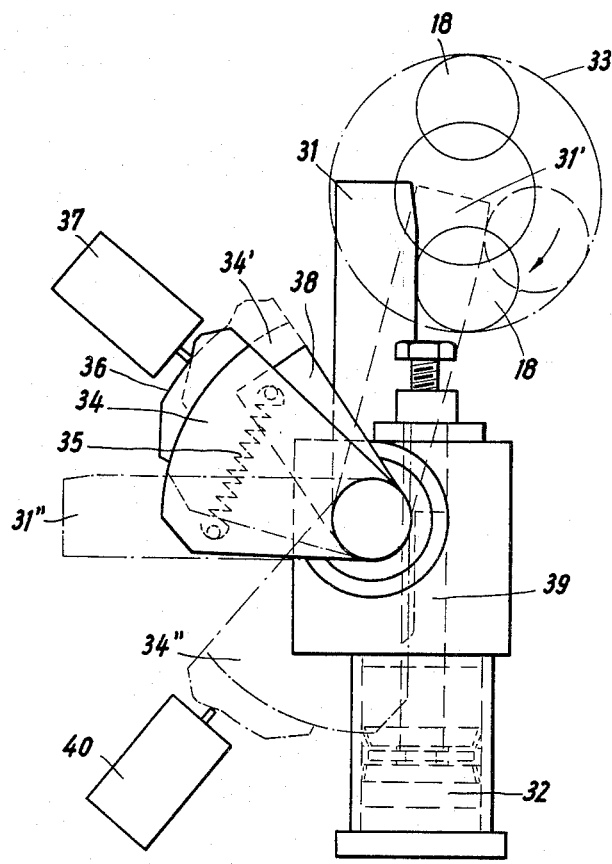
FIG. 4 is the mechanism for positioning the work.

FIG. 4 illustrates the mechanism employed for initially re-positioning the work. The free end of a pivoted lever 31 is arranged to be swung into range of the path of revolution of the crankpins 18. This lever 31 actuates a control lever 34 which is rigidly connected therewith. Normally, the deflected lever 31 and lever 34 will be in the positions indicated by dotted lines 31' and 34' respectively, a spring 35 having urged them into these positions. When the crankshaft has been loaded into the machine in the manner shown in FIG. 3 and its drive of rotation initiated lever 31 will be deflected into the path of revolution 33 of crank pin 18. When rotated crankpin 18 will therefore strike lever 31 in position 31' and entrain the same in the arrowed direction: In the course of this motion a cam 36 will first open the rest contact of a limit switch 37, causing the drive means to be switched off. The momentum continues to carry round the shaft and when lever 31 reaches the position shown in full lines cam 36 will again cooperate with the limit switch 37 and cause the drive means to be braked and the crankshaft to come to rest in the desired position. A restoring lever 38 actuated by piston 32 and rack 39 now pushes the entire lever system into the position 31″/34″ marked in dot-dash lines. In this position lever 31 is again outside the range of the eccentric path of revolution 33 of the workpiece. A second limit switch 40 releases the machine for the performance of the next operation the switch 40 controlling motors 41 and 42 when the switch 37 has been switched past.

When by the action of lever 31 the workpiece has been arrested in the position in which the crankpins are in their top or bottom dead centre positions the inductors can be lowered for the commencement of the hardening process.

Figure 5:
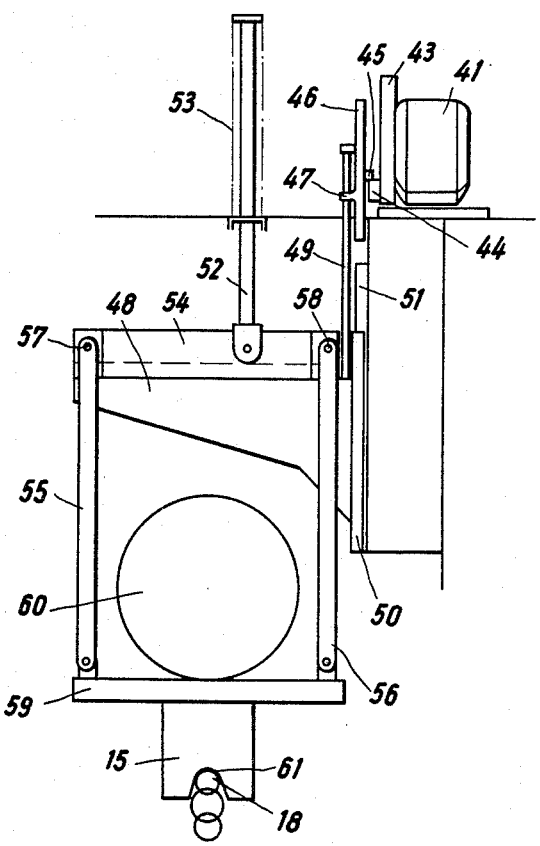
FIG. 5 is the suspension of a hardening unit comprising transformer and inductor.

The inductors are raised and lowered by the motors 41 and 42 and a crank motion shown in FIG. 2. The crank motion comprises a crank plate 43 fitted with a roller 44. Roller 44 bears against the underside of a bar 45 which is rigidly connected with a lifting slide 46. Rotation of the crank plate 43 thereof causes the slide 46 to be raised and lowered into its top and bottom dead centre positions. Affixed to the lifting slide 46 are guide members 47 which are slidably engaged by pins 49 attached to bracket 48. One of these brackets 48 is illustrated in FIG. 5 and, as will be seen by reference to FIG. 2, the first working station comprises preferably four such brackets 48. The brackets are mounted on a slide 50 which can be vertically raised and lowered in ball bearing slideways 51. By this mechanism the lifting slide 46 is adapted through the pins 49 to lift the brackets 48 into an upper and to lower them into a bottom position. When the brackets are in this latter position the pins 49 can freely slide in guide members 47 and therefore permit the brackets in their lower positions to ride up and down freely independently of the crank motion.

The weight of the brackets 48 and of the parts associated therewith is partly balanced by articulated rods 52 loaded by springs 53 in such manner that only a small downward over-weight load remains.

A top plate 54 which carries a parallelogram linkage is mounted on the top of bracket 48. The parallelogram linkage comprises two link rods 55 and 56 pivotally suspended from the top plate 54 at 57 and 58. A bottom plate 59 is similarly pivotably suspended from the lower ends of link rods 55 and 56. Mounted between the two link rods 55 and 56 of the parallelogram linkage is the disc-type transformer 60 for feeding an inductor 15. This transformer 60 stands on the bottom plate 59, whereas the inductor 15 is secured to the underside of the plate. Conveniently the inductor may be arranged to be exchangeable.

The effect of the described arrangement is to guide the bracket 48 and hence inductor 15 positively in the vertical direction. However, the parallelogram linkage permits the inductor 15 to participate in the path of rotation of the crankpins that are to be hardened. Furthermore, the hinges of the parallelogram linkage are deliberately provided with a certain amount of play, allowing for some lateral deflection. Consequently, the open mouth 61 of the inductor 15 can be readily lowered on to the crankpin that is to be hardened and is then free to ride on the crankpin whilst the latter performs its orbital travel when the work is rotated, after switching on the drive 30 by a limit switch on or operated by a pin 49. The arrangement also permits all the inductors to be jointly lowered on to their respective crankpins and the operation of heating the crankpins and quenching the same to be jointly performed whilst the workpiece rotates.

Conveniently inductors of conventional type may be used in which the heating conductor is suspended between two plates of non-ferromagnetic material, preferably brass or stainless steel, held together to form a kind of cage. The space between the plates is also arranged to accommodate a chamber for a quenching medium, provided with openings and spray orifices for discharging the medium into the mouth 61 of the inductor and hence on to the surface of the work. Such inductors permit the work to be quenched immediately the required hardening temperature has been attained, the delivery of the quenching medium taking place under the control of electromagnetically operated valves. No idle times therefore arise between the completion of the heating and the commencement of the quenching operations. For collecting the quenching medium a sump 62 is provided below the two frames 1 and 2. A machine according to the invention therefore dispenses with a quenching tank of the kind normally used in such machines.

When the workpiece has been quenched, the spindle heads 19 and 20 are axially retracted and release the workpiece which therefore drops down into the V's of the primary conveyor 5. The primary conveyor is set into motion and conveys the workpiece to the following hardening station where the same process is performed in analogous manner, e.g., on the main bearing portions of the shaft. According to existing operational circumstances a rest period may intervene in position 63 between one stage and the next.

The frames 1 and 2, as shown in FIG. 2, offer space for the accommodation of the capacitors and switch means required for electrically adjusting the inductors and for performing the switching operations involved in handling the workpiece, raising and lowering the inductors, switching the power on and off, and starting and stopping the discharge of the quenching medium.

It will be seen that the automatic crankshaft hardening machine described, works on the principle of sequential (programme) control e.g., when one operation has been completed, the next operation is initiated. The times of the individual operations can be independently adjusted. As is well known, a sequence of operations of this kind can be controlled by relays, for instance, the release of one relay can be used to trigger the next operation, the timing of the switching operation being adjustably controlled. Thus a limit switch may be operated at the end of one motion for the purpose of starting the next motion and it is thus possible without complicated control mechanisms to arrange for a completely automatic sequence of all operations. A conventional control mechanism may be included which stops the machine when one of the timed operations fails to proceed as prescribed, for instance as the result of the fracture of a water pipe or of some other uncontrollable reason, and this control mechanism may be designed to inactivate the machine if the duration of such an operation exceeds one working cycle of the machine.

What we claim is:

1. Apparatus for inductively heating, incidental to hardening, at least one crank pin of a crankshaft, comprising a frame, at least one unit comprising an inductor adapted only partially to embrace said pin, said unit comprising a slide and linkage means suspending said inductor from said slide, guide means for the said slide carried by the said frame; means for stepwise conveying crankshafts fed periodically in a line of production through the apparatus; means for removing each crankshaft in turn from said conveying means and engaging it for rotation, said last mentioned means comprising two centering elements for engaging and holding a said crankshaft therebetween and means for axially displacing at least one of said elements to effect said engagement and holding of the crank shaft; means for rotatably supporting said elements; means for rotating the said elements and means for stopping rotation of said elements with the said pin in a predetermined position; means operative in timed relation to the said stopping action to lower the said unit to cause the inductor to embrace the said pin; means timed with the lowering of the said unit to re-operate the means for rotating the said elements and thus to cause the shaft to rotate and permit the unit to descend, the said linkage permitting the inductor to be deflected whilst the said unit is descending and to participate in the orbital movement of the crankpin so that it remains in heating relation to the said pin whilst the shaft rotates; and means for releasing the treated crankshaft onto the said conveying means and means to raise the said unit.

2. Apparatus according to claim 1, comprising a plurality of said units operable in parallel planes and comprising a common drive means for the slides of the said units, said drive means comprising a vertically reciprocatable crossbar and crank means for displacing it, the said slides being suspended from said cross bar by means of rods which are freely slidably movable in the lowered position.

3. Apparatus according to claim 1, comprising counterbalancing means for partially balancing the weight of the slide and the inductor assembly suspended therefrom so that the weight nevertheless slightly exceeds the counter-balancing force.

4. Apparatus according to claim 1, comprising opposed co-operating spindles carrying the said elements, one of said spindles having plunger means whereby it can be so axially displaced and means associated with the other spindle for axially displacing it into a fixed limit position.

5. Apparatus according to claim 1, having means for driving at least one of said elements, that said element having a plate with a friction face for frictionally engaging the workpiece for drive of rotation.

6. Apparatus according to claim 1, said means for stopping the rotation of said elements comprising a lever adapted to project into the path of rotation of the crankpin, and means controlled by said lever to stop rotation of the shaft when the crankpin reaches the said predetermined position.

7. Apparatus according to claim 1, said conveying means being adapted to convey the workpiece in a horizontal direction at a level at which the work will be presented to the said centering elements slightly below the centre axis thereof said elements being adapted to raise the workpiece in centering the workpiece.

8. Apparatus according to claim 1, said conveying means comprising two laterally spaced tension members and V rests carried thereby to support the workpiece across the spaced members.

9. Apparatus according to claim 1, said conveying means comprising an intermittently movable conveyor for conveying a workpiece to at least one hardening station in a horizontal direction, and a preliminary conveyor for feeding workpieces to said first conveyor.

10. Apparatus according to claim 9 in which said preliminary conveyor is in the form of two spaced tension members carrying V rests for the work, the leading flanks of the said V rests each having a rising flange to facilitate correct alignment and transfer of the workpiece from the one conveyor to the other.

11. Apparatus according to claim 1 comprising at least two hardening stations, said conveying means serving for conveying the workpiece to first one station and then the other, one said station comprising the said means for inductively heating at least one crankpin of the shaft being treated and another said station comprising inductor means for heating at least one main bearing portion of the said shaft.

12. Apparatus for inductively heating, incidental to hardening, at least one crankpin of a crankshaft, comprising at least one unit comprising an inductor adapted only partially to embrace said pin, and linkage means suspending said inductor, means for mounting and rotating the crankshaft comprising two centres between which the shaft can be secured, conveyor means for conveying a shaft to the shaft mounting and rotating means, means operative to transfer support of the shaft from the conveyor to a gripped position between the said centres, means operatively timed in relation to said transfer for bringing the crankshaft and the inductor into a predetermined positional relationship, means operatively timed in relation to the operation of said last mentioned means for bringing the inductor into a position partially embracing a crankpin of said gripped shaft, and means operative in timed relation to such positioning of the inductor to rotate the shaft after the inductor has been brought into said embracing relation with the pin, the said linkage being constructed and arranged so that the inductor follows the orbit of and rides on the surface of the crankpin and remains in embracing heating relation with the said pin during such rotation, means for releasing the treated crankshaft onto said conveying means and means to raise the said unit.

References Cited by the Examiner
UNITED STATES PATENTS

| | | | |
|---|---|---|---|
| 2,301,083 | 11/42 | Seamans | 266—4 |
| 2,665,126 | 1/54 | Roehm | 266—4 |
| 2,787,566 | 4/57 | Seulen et al. | 266—4 |
| 2,794,894 | 6/57 | Tudbury | 266—4 |
| 2,872,175 | 2/59 | Guenzi | 266—5 |

MORRIS O. WOLK, *Primary Examiner.*

RAY K. WINDHAM, JAMES H. TAYMAN, Jr.
*Examiners.*